Sept. 3, 1957 V. L. HALLENBECK 2,805,182
ELASTIC POLYURETHANE ELASTOMER COMPOSITES
Filed Dec. 22, 1955
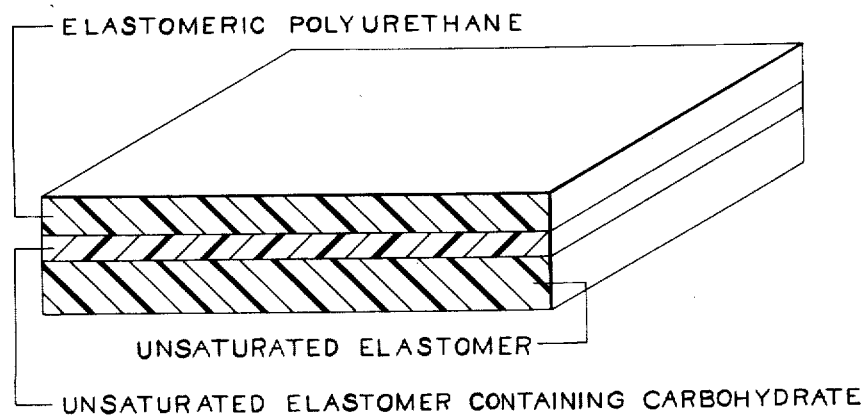

United States Patent Office 2,805,182
Patented Sept. 3, 1957

2,805,182

ELASTIC POLYURETHANE ELASTOMER COMPOSITES

Victor L. Hallenbeck, Cleveland, Ohio, assignor to The B. F. Goodrich Company, New York, N. Y., a corporation of New York Application December 22, 1955, Serial No. 565,291

5 Claims. (Cl. 154—48)

This invention relates to elastic composite structures wherein an elastomeric polyurethane, a tie-gum composition and unsaturated elastomers are adhered together. More specifically, the invention relates to elastic composite structures comprising elastomeric polyurethanes and an unsaturated elastomeric material bonded together with an unsaturated elastomeric material containing a finely divided carbohydrate.

Elastomeric polyurethanes are well known. These elastomers are ordinarily prepared by reacting a polyester, a polyesteramide or a polyether glycol with a polyisocyanate, often with other reactive additives such as water. Polyurethanes of this nature, and the preparation thereof, are described in U. S. Patents 2,620,516, 2,621,166, 2,625,531, 2,625,532, 2,625,535, 2,692,873, 2,692,874 and 2,702,797. The elastomeric (rubbery) polyurethanes when vulcanized have high tensile strengths, are exceedingly resistant to abrasion, and are resistant to oxidation and many solvents. Because of these outstanding physical properties, it is desirable to make use of these materials in a variety of applications, in tires, belts, luggage, shoe soles, shoe uppers and the like. For economic and other reasons, it is not always possible or desirable to employ the elastomeric polyurethane alone since it is often desirable to also have present other rubbers for advantages which the polyurethanes do not possess, for example, in tires where the polyurethane would be of most value in the tread portion. In such cases it is desired to prepare composite structures and the polyurethanes must be adhered to the other elastomeric materials employed. To date, poor adhesion, and lack of suitable methods for adhering polyurethanes to other elastomers, have been some of the major drawbacks to more widespread use of these valuable materials.

It is accordingly a primary object of this invention to provide elastic composite structures of elastomeric polyurethanes and unsaturated elastomers such as natural rubber; synthetic polyisoprene; copolymers of butadiene and styrene, butadiene and acrylonitrile, butadiene and methyl vinyl pyridine, butadiene and esters of acrylic and methacrylic acid; and the like. More particularly it is an object to provide vulcanized elastic composite structures of an elastomeric polyurethane and unsaturated elastomer which are strongly adhered together so as to resist separation during high temperature flexing. Other objects of the invention will be apparent from the description which follows.

The single figure of drawing is a fragmentary perspective view of a portion of a novel composite structure embodying the invention.

The objects of this invention are accomplished through the use of a vulcanizable tie-gum composition comprising an unsaturated elastomer such as natural rubber and a finely divided carbohydrate, such as sugar and starch, which tie-gum is used between and to adhere together a vulcanizable elastomeric polyurethane compound and a vulcanizable unsaturated elastomeric compound, which three materials are vulcanized together to form an elastic composite structure of outstanding physical properties, the components of which adhere together even at high temperatures and under excessive flexing conditions.

In the practice of the invention the tie-gum is prepared as a vulcanizable compound of an unsaturated elastomeric material with from about 50 to about 100 weight parts of the carbohydrate, preferably finely divided sugar intimately mixed therein. The composition is calendered and placed between vulcanizable compounded stocks of an elastomeric polyurethane and a vulcanizable compounded stock of another unsaturated elastomeric material such as natural rubber, interpolymers of butadiene-1,3 and the like. The resulting composite is cured together into an elastic structure which has exceptional strength. The tie-gum ordinarily is employed in the form of a thin sheet which can be obtained by calendering. The thickness of the ply may vary from about $\frac{1}{64}$ inch to about $\frac{1}{8}$ inch stock as in normal tie-gum stocks. Thicker stocks may be used but without further advantage.

The carbohydrate employed may be starch or dextrin and more preferably a sugar; which sugar may be a monosaccharide including the pentoses and hexoses, and an oligosaccharide, preferably a disaccharide. The pentoses include arabinose, xylose and the like; the hexoses include glucose, mannose, galactose, frutose, sorbose and the like; and the disaccharides include sucrose, lactose, maltose and the like. Any of the sugars may be employed in the process of this invention, but sucrose is most preferred.

The amount of carbohydrate may be varied from about 50 to about 100 weight parts per 100 weight parts of the unsaturated elastomeric material with which it is mixed. Preferably the amount employed is from about 60 to about 90 weight parts. Although adhesion results using 100 weight parts of sugar are not as outstanding as those obtained with about 75 weight parts, useful composite structures may be prepared at this high concentration. Likewise, when 50 weight parts of sugar are employed, composites which are less valuable, although still useful for structures which are not subjected to excessive tearing forces, are also obtained.

A preferred form of the sugar is the finely divided confectioner's sugar which is well known. Granulated sugar (cane or beet sugar) ground to an equivalent degree of fineness is also satisfactory. Such materials ordinarily have an average particle size of about 50–70 microns, ranging in size from about 50 to about 150 microns. Starch of this same particle size range is also useful. Carbohydrates of average particle less than about 40 microns do not give best results and materials of an average particle size of greater than about 150 microns are unsatisfactory; materials with an average particle size ranging between about 50 and 100 microns are preferred. More useful and easily obtained is confectioners sugar or ground granulated sugar.

Any of the elastomeric polyurethanes may be used to make valuable composite structures with unsaturated elastomers. The polyurethane elastomers are ordinarily prepared by reacting a polyester, which is preferably hydroxyl terminated, a polyesteramide or a polyether glycol with a polyisocyanate, often with other reactive additives such as water, ethylene glycol and the like. Valuable elastic polyesterurethanes may be prepared, for example, by reacting about equimolar proportions of an aromatic diisocyanate such as 1,5-naphthylene diisocyanate, paraphenylene diisocyanate, 2,4-tolylene diisocyanate and the like with an essentially hydroxyl terminated polyester having a molecular weight from about 500 to about 5000, more preferably from about 800 to about 2000. The polyesters are ordinarily prepared by reacting an excess of a glycol containing 2 to 6 or more carbon atoms with an aliphatic dicarboxylic acid containing from 4 to 10 or more carbon atoms, which mixtures may also contain small amounts of aliphatic diamines, water, glycols and the like. Other elastomeric polyurethanes are prepared by reacting one mol of a polyethylene ether glycol such as polytetramethylene ether glycol of molecular weights from about 2000 to 400, with about 2 mols of an aromatic diisocyanate and about one-half mol of water. Ordinarily an elastomeric gum-like material is obtained which is then vulcanized or cross-linked in order to obtain optimum physical properties by heating the polyurethane with additional amounts of organic polyisocyanates such as 1,5-naphthylene diisocyanate, p-phenylene diisocyanate, 2,4-tolylene diisocyanate, 2,4-tolylene diisocyanate dimer, triphenyl methane triisocyanate, 1,6-hexane diisocyanate, diphenylene methane diisocyanate, durene diisocyanate, and the like; preferably aromatic diisocyanates and dimers thereof. In any event, so long as a vulcanizable elastomeric polyurethane is obtained it may be used to provide valuable composite structures with other unsaturated elastomeric materials, which composites have excellent resistance to high temperature flexing. Accelerators which are often useful for this vulcanization reaction include the tertiary amines such as triethyl amine, tribenzyl amine and the like.

The term elastomeric is understood to include the normally rubbery materials known to those skilled in the art. Such materials normally are easily extensible and quickly self retractable to substantially the original size and shape at room temperature.

*Example 1*

A typical structure of the invention is now described. A natural rubber compound suitable for use in cured applications is prepared by mixing with 100 weight parts of rubber 10 weight parts of zinc oxide, 1.5 weight parts of phenylbetanaphthyl amine, 50 weight parts of carbon black, 1 weight part of stearic acid, 5 parts of petroleum base softener, 2.5 parts of sulfur and 0.75 part of an accelerator (selenium diethyldithiocarbamate). The tie-gum is prepared by milling 75 parts of confectioners' sugar per 100 parts of natural rubber into a portion of this rubber compound. This sugar containing compound, the tie-gum, is formed into a sheet about 1/32 of an inch in thickness. This tie-gum has excellent tack. An elastomeric polyurethane, derived from a mixture of one mol hydroxyl polyethylene adipate of a molecular weight of about 1200 and 0.3 mol of water reacted with 1.25 mols of p-phenylene diisocyanate to form a rubber-like material, is mixed on a rubber mill with 6 weight parts of tolylene diisocyanate dimer, 0.5 weight part of tribenzyl amine, and 5.08 parts of dibenzyl sebacate. The natural rubber-sugar tie-gum composition is placed between 1/8 inch thick strips of the natural rubber composition described first above and the polyurethane rubber composition, the composite is backed with cotton duck fabric and the composite is vulcanized under pressure at 300° F. for 30 minutes. The vulcanized composite is cooled in the mold before being removed. Samples of this elastic composite are flexed 500,000 times at room temperature, at 150° F., and at 212° F. The adhesion values (as pounds per linear inch required to separate the layers of the composite) of such composites after this flexing, determined at room temperature, are as high as 48 pounds, 42 pounds and 44 pounds. Three other samples are flexed 500,000 times at room temperature, at 150° F. and 212° F. The adhesion values of the composites are then determined at 150° F. The values obtained are 38 pounds, 39 and 38 pounds. Other samples of the composite flexed 500,000 times at 150° F. and 212° F. are tested for adhesion at 212° F. Adhesion values of 29 pounds and 30 pounds are obtained.

*Example II*

The procedure of Example I is repeated with the exception that granulated cane sugar is used in place of confectioners' sugar. The granulated cane sugar is finely ground in a ball mill until it has a particle size which approximates the particle size distribution of confectioners' sugar. Screen analysis of this material shows 1.7% retained on a 100 mesh screen, 21.5% retained on a 200 mesh screen, 72.3% retained on a 325 mesh screen and 3.5% retained on a 400 mesh screen. Adhesion values for the vulcanized elastic composite prior to flexing are 45 pounds at room temperature, 47 pounds at 150° F. and 22 pounds at 212° F. After flexing for 500,000 times at room temperature, adhesion values are obtained as follows: 45 pounds at room temperature, 37 pounds at 150° F. and 29 pounds at 212° F. After flexing 500,000 times at 212° F. the following adhesion values are obtained: 40 pounds at room temperature, 35 pounds at 150° F. and 27 pounds at 212° F. The adhesion strength of the elastic composites of Examples I and II after high temperature flexing, determined at high temperatures is outstanding and quite unexpected.

*Example III*

When the above procedure is repeated with finely divided starch in place of sugar, adhesion values of 47 pounds after 500,000 flexures at room temperature are obtained. Less valuable adhesive properties are obtained at higher temperatures of flexing. While starch is not as satisfactory as finely divided sugar for applications which require high temperature flexing it is quite satisfactory as an ingredient of the tie-gum compositions for composite structures which will be flexed at more normal temperatures and represents a substantial improvement over compositions which do not contain starch.

When a tie-gum containing no sugar or starch is used to make similar composite structures of the nature described above, poor adhesion between the elements of the composite is obtained and the structure may be pulled apart by hand. When the above experiments are repeated with other natural rubber compounds, with other elastomeric polyurethanes including glycol and amine extended polyurethanes, polyether glycol based polyurethanes and polyurethanes containing carbon black, similar results are obtained.

*Example IV*

When experiment I is repeated employing a tie-gum composition containing 100 parts of sugar; composite structures are obtained which have adhesive strengths after flexing 500,000 times at room temperature of 30 pounds, after flexing 500,000 times at 150° F. a value of 29 pounds, and after flexing 500,000 times at 212° F. an adhesive value of 12 pounds.

The type of unsaturated elastomeric rubbery material employed may be varied quite widely although better composites are prepared from natural rubber. The unsaturated elastomers employed preferably have a major proportion of the polymer chain derived from conjugated aliphatic diolefins. Both the polyurethane elastomer and the unsaturated elastomer may be compounded to produce the products having a variety of physical properties as is well known to those skilled in the art and one is still able to obtain good adhesion between the two so long as the defined tie-gum is employed. Of course, it is essential that the 3 elements of the composite be vulcanized together. Ordinarily, vulcanization of the tie-gum and unsaturated elastomer is effected through the use of sulfur and accelerators.

Compositions containing the normal compounding ingredients such as carbon black, softeners, plasticizers, antioxidants, zinc oxide, and fillers, coloring materials and the like of course are contemplated. In many applications, fabric backings are quite useful.

As stated, it is essential that the tie-gum composition be one that can be vulcanized and it is preferred, as will be recognized by those skilled in the art, that the tie-gum compositions be vulcanized or cured at a reasonable rate; preferably at a cure rate similar to that of the elastomeric materials to be adhered together. The presence of the finely divided carbohydrate in the tie-gum compositions tends to slow down the cure rate of the unsaturated elastomer and it ordinarily will be necessary to compensate for this factor by use of suitable amounts of sulfur and other vulcanization aids such as the accelerator as is well known to those skilled in the art. When the tie-gum compounds do not vulcanize, the composite structures are readily torn apart with the application of only a few pounds of force.

*Example V*

While natural rubber is the preferred unsaturated elastomer used in the tie-gum compositions, other unsaturated elastomers may be similarly used although generally with not such outstanding hot temperature flexing results. For example, a copolymer of a monomer mixture of about 60% butadiene-1,3 and about 40% acrylonitrile employed in place of natural rubber in compositions similar to those described in Examples I and II results in composite structures having room temperature adhesion of 74 pounds. Similarly, Neoprene in similar composites results in structures requiring 25 pounds to separate the elements.

For applications where excessive hot flexing is not required, composites of outstanding strength are obtained with such unsaturated elastomeric materials as interpolymers of butadiene with styrene, acrylonitrile, esters of acrylic and methacrylic acid, vinyl pyridine and the like; polyisoprene, polychlorobutadiene and the like. Preferred composites are obtained when the tie-gum composition is based on natural rubber, even when the other unsaturated elastomer to which the polyurethane is to be adhered is another rubber. Composites of multiple plies may be prepared. Fabric reinforced composites are particularly valuable. Important applications of the products described are in adhering polyurethane tire tread stocks to natural rubber or other elastomer based carcasses, and in belts.

I claim:

1. A composite elastic structure comprising in adherent relation consecutive layers of (1) an elastomeric polyurethane, (2) an unsaturated elastomeric material containing from about 50 to about 100 weight parts, per 100 weight parts of said unsaturated elastomeric material, of a carbohydrate selected from the class consisting of sugars and starch, and (3) an unsaturated elastomeric material.

2. A composite elastic structure comprising in adherent relation a first layer comprising a vulcanized elastomeric polyurethane compound, an inner layer comprising a vulcanized unsaturated elastomeric material containing from about 60 to about 90 weight parts of finely divided sugar per 100 weight parts of unsaturated elastomer, and an outer layer comprising a vulcanized unsaturated elastomer composition.

3. A composite elastic structure comprising in adherent relation a first layer of a vulcanized compound of an elastomeric polyesterurethane and an organic diisocyanate, an inner layer comprising a vulcanized compound of natural rubber containing intimately dispersed therein about 75 weight parts of finely divided sucrose having an average particle size between about 50 and 100 microns per 100 weight parts of natural rubber, and an outer layer comprising a vulcanized compound of natural rubber.

4. A composite elastic structure comprising in adherent relation a layer of a vulcanized compound of an elastomeric polyesterurethane and an organic diisocyanate, an inner layer comprising a vulcanized compound of natural rubber containing intimately dispersed therein about 75 weight parts of finely divided sucrose having an average particle size of between about 50 and 100 microns per 100 weight parts of natural rubber, and an outer layer comprising a vulcanized compound of an unsaturated elastomeric material.

5. A composite elastic structure comprising a layer of a vulcanizable composition of an elastomeric polyesterurethane and an organic diisocyanate, a layer comprising a vulcanizable composition of an unsaturated elastomeric material containing intimately dispersed therein about 50 to 100 weight parts, per 100 weight parts of unsaturated elastomeric material, of a finely divided carbohydrate selected from the class consisting of sugars and starch, and a layer comprising a vulcanizable composition of an unsaturated elastomeric material, the layer of vulcanizable unsaturated elastomeric material containing the finely divided carbohydrate being in intimate adherent relationship and interposed between said other two layers.

References Cited in the file of this patent

UNITED STATES PATENTS

| | | |
|---|---|---|
| 2,650,206 | Stock | Aug. 25, 1953 |
| 2,685,109 | Balkin et al. | Aug. 3, 1954 |
| 2,713,884 | Schwartz | July 26, 1955 |
| 2,749,960 | Schwartz | June 12, 1956 |

UNITED STATES PATENT OFFICE

CERTIFICATE OF CORRECTION

Patent No. 2,805,182 September 3, 1957

Victor L. Hallenbeck

It is hereby certified that error appears in the printed specification of the above numbered patent requiring correction and that the said Letters Patent should read as corrected below.

Column 3, line 7, for "2000 to 400" read -- 2000 to 4000 --.

Signed and sealed this 29th day of October 1957.

(SEAL)
Attest:

KARL H. AXLINE
Attesting Officer

ROBERT C. WATSON
Commissioner of Patents